United States Patent
Rosen et al.

[11] Patent Number: 5,758,606
[45] Date of Patent: Jun. 2, 1998

[54] METHOD OF AND DEVICE FOR SUPPLYING WATER OR OTHER VAPOR TO THE INTAKE AIR OF AN INTERNAL COMBUSTION ENGINE

[75] Inventors: Per Rosen; Lars-Ola Olsson, both of Lund, Sweden

[73] Assignee: Munters Euroform GmbH, Aachen, Germany

[21] Appl. No.: 702,610
[22] PCT Filed: Jan. 16, 1995
[86] PCT No.: PCT/SE95/00026
 § 371 Date: Oct. 8, 1996
 § 102(e) Date: Oct. 8, 1996
[87] PCT Pub. No.: WO95/23286
 PCT Pub. Date: Aug. 31, 1995

[30] Foreign Application Priority Data

Feb. 25, 1994 [SE] Sweden ................ 9400652

[51] Int. Cl.⁶ .................................. F02B 47/02
[52] U.S. Cl. ................ 123/25 B; 123/25 P; 123/25 Q
[58] Field of Search ..................... 123/25 R, 25 A,
 123/25 B, 25 C, 25 D, 25 P, 25 Q

[56] References Cited

U.S. PATENT DOCUMENTS

| | | | |
|---|---|---|---|
| 4,625,681 | 12/1986 | Sutekiyo | 123/3 |
| 4,725,226 | 2/1988 | Balsiger et al. | 123/25 A |
| 5,125,377 | 6/1992 | Mezheritsky | 123/25 B |
| 5,131,229 | 7/1992 | Kriegler et al. | 123/25 B |
| 5,396,866 | 3/1995 | Kuntz | 123/25 B |

FOREIGN PATENT DOCUMENTS

| | | | |
|---|---|---|---|
| 2501771 | 7/1976 | Germany | 123/25 A |
| 58-32920 | 2/1983 | Japan | 123/25 A |
| 1028857 | 7/1983 | U.S.S.R. | 123/25 A |
| 1132043 | 12/1984 | U.S.S.R. | 123/25 A |
| 2259326 | 3/1993 | United Kingdom | 123/25 A |

*Primary Examiner*—Erick R. Solis
*Attorney, Agent, or Firm*—Herbert Dubno

[57] ABSTRACT

The invention relates to a method for supplying vapor to intake air that is supplied to an internal combustion engine. The method comprises the steps of compressing the intake air before supplying the vapor and contacting, in a moistening means, the intake air with liquid, by simultaneously feeding the compressed intake air and the liquid into the moistening means and causing the intake air and the liquid to flow in opposite directions through the moistening means. The invention also relates to a device for supplying vapor to the intake air of an internal combustion engine, to which a compressor for compressing the intake air is connected. The device comprises a moistening means, which is connected between the compressor and the engine and which comprises a first connection for feeding the water into the moistening means and a second connection for feeding the intake air into the moistening means, the moistening means being adapted to carry out the supply of water vapor to the intake air by contacting the intake air and the water with each other, while flowing in opposite directions through the moistening means.

6 Claims, 1 Drawing Sheet

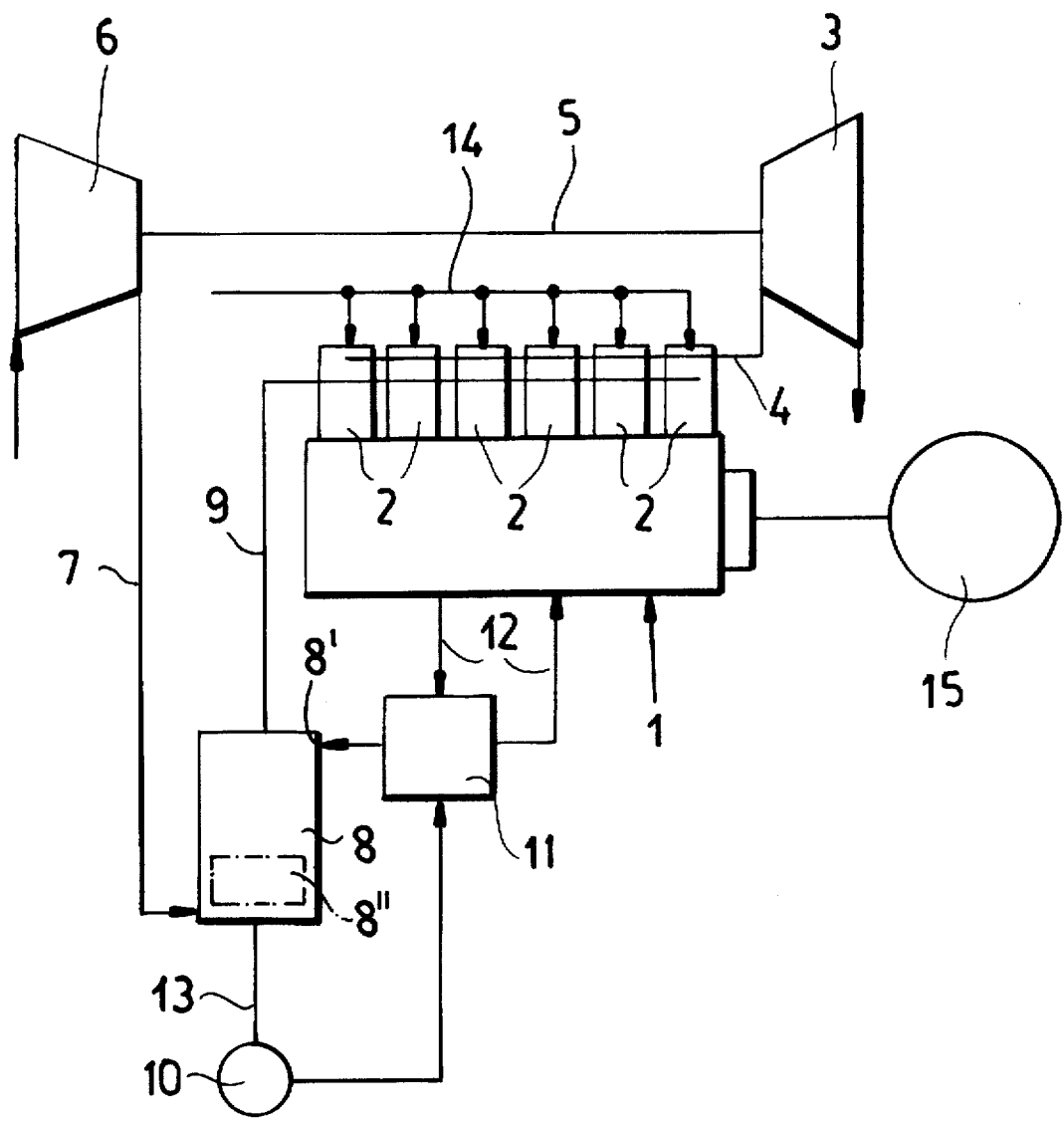

5,758,606

METHOD OF AND DEVICE FOR SUPPLYING WATER OR OTHER VAPOR TO THE INTAKE AIR OF AN INTERNAL COMBUSTION ENGINE

CROSS REFERENCE TO RELATED APPLICATIONS

This application is a national stage of PCT/SE95/00026 filed 16 Jan. 1995 and based upon Swedish national application 9400652-5 of 25 Feb. 1994 under the International Convention.

FIELD OF THE INVENTION

The present invention relates to a method for supplying water or another vapor to the intake air of an internal combustion engine, and to a device for carrying out the method.

BACKGROUND OF THE INVENTION

The principle of supplying water vapour to the intake air of an engine is known. This is done, inter alia, in so-called turbo-charged internal combustion engines. Such moistening of the air yields, above all, a reduction of emissions of nitric oxide. This is of particular interest in engines which operate with excess air and therefore cannot be provided with three-way catalysts. It is also known to supply, in the same manner, evaporated fuel to alcohol-powered engines.

A device for supplying water vapor to the intake air of the engine is disclosed in Patent Specification U.S. Pat. No. 4,632,067. In this device, like in other known devices applied in the same manner, water vapor forms by direct heating of the water by a heating element, whereupon the water vapor is mixed with the air that is supplied to the engine. This technique of evaporating the water requires high-grade energy in relatively large amounts. Moreover, the regulation of the amount of supplied water vapor (or some other vapor) is difficult, since the vapor must be supplied in a well-balanced amount per liter of air for optimum results and, frequently, the flow of the intake air strongly varies during short periods.

OBJECT OF THE INVENTION

An object of the present invention is to provide a method for supplying water or another vapor to the intake air of an engine and to a device for carrying out the method, which eliminate the above-mentioned drawbacks of the prior-art techniques and drastically reduce the levels of nitric oxide emissions from the internal combustion engine, while simultaneously increasing the degree of utilization of the fuel.

This object is achieved in a method for supplying vapor to intake air that is supplied to an internal combustion engine which comprises the steps of contacting, in a moistening means, the intake air with liquid, the vapor being simultaneously fed into the intake air and the liquid into the moistening means, and causing the intake air and the liquid to flow in opposite directions through the moistening means.

According to the invention the intake air is compressed before the vapor is supplied, and using the energy inherent in the cooling water or exhaust gases of the engine the liquid forming the vapor is preheated before feeding it thereof into the moistening means. The liquid can be fed into an upper part of the moistening means and dispersed into a mist. The mist is permitted to fall freely down through the moistening means. The intake air is fed into a lower part of the moistening means and the intake air is caused to flow up through the mist.

According to the invention the liquid is caused to flow into an upper part of the moistening means and the liquid is spread over a body arranged in the moistening means and caused to flow downwardly along this body. The intake air is fed into a lower part of the moistening means and caused to flow upwards along the body.

A device for supplying vapor to the intake air that is supplied to an internal combustion engine then comprises a moistening means which has a first connection for feeding liquid into the moistening means and a second connection for feeding the intake air into the moistening means. The moistening means is adapted to carry out the supply of vapor to the intake air by contacting the intake air and the liquid with each other, while the flow in opposite directions through the moistening means in the device further comprises a preheater which is connected to the first connection of the moistening means for preheating the liquid before feeding it into the moistening means, the preheater being connected either to the cooling water or to the exhaust gases of the engine for transmitting the energy contained in the cooling water to the liquid. The second connection of the moistening means is connected to a compressor adapted to compress the intake air and connected to the engine.

A nozzle is arranged in the upper part of the moistening means and is connected to the first connection for spreading and dispersing the liquid to a mist. The moistening has an arrangement which is mounted in the moistening means and along which the liquid flows downwards.

SUMMARY OF THE INVENTION

By direct evaporation of the liquid in the intake air that is obtained, it is possible to achieve, as a special advantage, self-regulation of the amount of vapor in the intake air, and therefore no separate regulation of the amount of air in the intake air is required.

We can recover the energy for the evaporation from low-grade waste energy produced in the combustion process in the engine.

BRIEF DESCRIPTION OF THE DRAWING

The invention is described in greater detail with reference to the accompanying drawing the sole FIGURE of which is a diagram of a system including an internal combustion engine and utilizing the method of the invention.

SPECIFIC DESCRIPTION

The FIGURE illustrates an internal combustion engine 1 with six cylinders 2. The engine is a turbo-charged diesel engine. The turbocharger comprises a turbine 3, which is connected to the exhaust gas side of the engine 1 via an exhaust gas conduit 4. The turbine is, via a shaft 5, connected to and drives a compressor 6 for compressing the air supplied to the engine 1 on the intake side thereof via a first air conduit 7. Between the compressor 6 and the engine 1 a moistening means 8 is arranged, which in this embodiment is a moistening tower 8 connected for supplying water vapor to the intake air before its being supplied to the engine 1 via a second air conduit 9. The water vapor is produced from water supplied from a tank 10, via a heat exchanger 11, to the moistening tower 8. In the heat exchanger 11, the water is heated by the engine cooling water, which circulates past the heat exchanger 11 via a conduit 12. The water is fed into the upper part of the moistening tower 8, while the air is fed into the lower part of the moistening tower 8. The water is dispersed in the moistening tower 8 by means of a nozzle 8' to a mist which falls down, and is then again collected at the bottom of the moistening tower 8, from which it is discharged to the tank 10 via a conduit 13. At the same time, the air is fed under pressure into the moistening tower 8 and flows upwards and out into the second air conduct 9. In the moistening tower 8, the air and the water are contacted with each other, while flowing in opposite directions. Fuel is supplied to the engine 1 via a fuel line 14, and the engine is connected to a generator 15.

The supply of vapor occurs as follows. The intake air is compressed in the compressor 6, which, via the shaft 5, is driven by the turbine 3, which in turn is driven by the exhaust gases of the engine 1. The compressed and, thus, heated intake air is conducted to the lower part of the moistening tower 8, but, where appropriate, above the water that is collected at the bottom of the moistening tower 8. Water is from the tank 10 is fed into the upper part of the moistening tower 8 and upon passing through the heat exchanger becomes heated. In the moistening tower 8, the water is dispersed to a mist and passes, while falling down through the moistening tower 8, through the intake air flowing up through the moistening tower 8. Part of the water is evaporated and accompanies the intake air out of the moistening tower 8 and into the combustion chamber of the engine 1. A significantly greater flow of water is thus supplied as compared to the flow of water that is evaporated. Consequently, the evaporation energy is taken from the actual water. This is an enthalpy change. When the evaporation of water is effected in this manner in a gas mixture, the evaporation occurs at considerably lower temperatures than is case of only water being present, such as in the prior-art technique, owing to the evaporation occurring at the partial pressure which, the water vapor exerts in the gas mixture. This implies that the evaporation close to the point where the air is supplied to the moistening tower 8 will occur at a very low temperature and increases upwards through the moistening tower 8 as the moisture content and, thus, the partial pressure increase. When a powerful evaporation as mentioned above occurs at a relatively very low temperature, it becomes possible to use low-grade energy for the evaporation process. Low-grade energy is obtained in great amounts as excess heat from the engine 1 in the cooling water or exhaust gases. Thus, the cooling water, as mentioned above, the exhaust gases, or both can be used for preheating the water before its being supplied to the moistening tower 8.

Preferred embodiments of the method and the device according to the invention have now been described. These should be considered as examples only, and many modifications are feasible within the scope of the invention, as defined in the accompanying claims. For example, instead of water any liquid that is desirable and suitable can be evaporated. The nozzle which disperses the liquid can be replaced by e.g. an arrangement 8" over which or through which, depending on its design, the liquid flows towards the bottom of the moistening means.

We claim:

1. A method of operating an internal combustion engine, comprising the steps of:

(a) driving an internal combustion engine while supplying intake air thereto, producing exhaust gases and heating cooling water to the engine;

(b) compressing said intake air to produce compressed intake air;

(c) preheating a liquid to be evaporated to produce a vapor with said cooling water or said exhaust gas; and (d) contacting the compressed intake air with the preheated liquid to form a vapor of said liquid in said intake air whereby said vapor is entrained into said engine with said intake air, said intake air and said liquid flowing in opposite directions during contact of said intake air with said preheated liquid.

2. The method defined in claim 1 wherein the preheated liquid is contacted with the compressed intake air by feeding the compressed intake air into a lower part of a moistener in which a mist of the preheated liquid is dispersed and causing the intake air to flow upwardly through said mist.

3. The method defined in claim 1 wherein the preheated liquid is contacted with the compressed intake air by spreading said liquid over a body in a moistener and causing said intake air to flow upwardly along said body.

4. An internal combustion engine system comprising:

an internal combustion engine supplied with intake air, producing exhaust gas and cooled with cooling water which is heated by said engine;

means operated by said engine for compressing said intake air before said intake air is fed to said engine;

a heat exchanger heated by said exhaust gas or said cooling water for preheating a liquid whose vapor is to be added to said intake air before said intake air is supplied to said engine; and a moistener connected to said heat exchanger for receiving said preheated liquid and compressed intake air for contacting said preheated liquid with said compressed intake air and producing vapor of said preheated liquid in said intake air, said vapor being entrained into said engine with said intake air, said intake air and said liquid flowing in opposite directions during contact of said intake air with said preheated liquid.

5. The internal combustion engine system defined in claim 4 further comprising a nozzle for dispersing said liquid to form a mist, said intake air passing upwardly through said mist.

6. The system defined in claim 4 wherein said moistener has a body along which liquid flow downward and said intake air flows upward.

* * * * *